United States Patent
Shibata

(10) Patent No.: US 12,496,852 B2
(45) Date of Patent: Dec. 16, 2025

(54) LAMINATE FOR TIRES

(71) Applicant: The Yokohama Rubber Co., LTD., Tokyo (JP)

(72) Inventor: Hirokazu Shibata, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 1250 days.

(21) Appl. No.: 16/560,940

(22) Filed: Sep. 4, 2019

(65) Prior Publication Data

US 2020/0001649 A1    Jan. 2, 2020

Related U.S. Application Data

(63) Continuation-in-part of application No. 14/412,550, filed as application No. PCT/JP2013/067367 on Jun. 25, 2013, now abandoned.

(30) Foreign Application Priority Data

Jul. 3, 2012   (JP) ................................. 2012-149918

(51) Int. Cl.
| | |
|---|---|
| *B60C 1/00* | (2006.01) |
| *B60C 5/14* | (2006.01) |
| *C08L 7/00* | (2006.01) |
| *C08L 9/00* | (2006.01) |

(52) U.S. Cl.
CPC ............. *B60C 1/0008* (2013.01); *B60C 5/14* (2013.01); *C08L 7/00* (2013.01); *C08L 9/00* (2013.01)

(58) Field of Classification Search
CPC ......... B32B 25/08; B32B 25/14; B32B 25/18; B60C 1/0008; B60C 5/14
See application file for complete search history.

(56) References Cited

U.S. PATENT DOCUMENTS

| | | | | |
|---|---|---|---|---|
| 6,627,687 | B2* | 9/2003 | Hatano | C08K 5/098 524/323 |
| 2002/0151636 | A1* | 10/2002 | Wada | C08L 21/00 524/445 |
| 2005/0182178 | A1* | 8/2005 | Hochi | B60C 1/0025 524/447 |
| 2008/0305316 | A1* | 12/2008 | Kaneshiro | H05K 1/0346 428/220 |
| 2009/0068476 | A1* | 3/2009 | Kirino | B32B 7/12 428/448 |
| 2009/0242094 | A1* | 10/2009 | Kato | B60C 5/14 152/565 |
| 2010/0160489 | A1* | 6/2010 | Hotaka | C08K 3/013 523/150 |
| 2010/0181003 | A1* | 7/2010 | Inoue | B60C 1/0016 523/150 |
| 2010/0186866 | A1* | 7/2010 | Tomoi | B60C 1/0008 152/510 |
| 2011/0190440 | A1* | 8/2011 | Ohta | B60C 1/0008 524/526 |
| 2013/0078477 | A1* | 3/2013 | Shibata | C08L 21/00 428/475.5 |
| 2013/0174933 | A1* | 7/2013 | Yamakawa | B32B 1/08 138/137 |
| 2013/0303657 | A1* | 11/2013 | Miyazaki | C08L 7/00 523/156 |
| 2014/0110032 | A1* | 4/2014 | Ogasawara | B32B 25/16 156/123 |

FOREIGN PATENT DOCUMENTS

| | | | | |
|---|---|---|---|---|
| JP | 2003261834 | A * | 9/2003 | |
| JP | 2009248770 | A * | 10/2009 | |
| JP | 2010058290 | A * | 3/2010 | |
| WO | WO-2011155547 | A1 * | 12/2011 | B32B 25/08 |
| WO | WO-2012039203 | A1 * | 3/2012 | B32B 25/14 |
| WO | WO 2014/020909 | A1 | 2/2014 | |

OTHER PUBLICATIONS

Rubber World Apr. 2003 pp. 30-36.*
English machine translation JP-2003261834-A (2003).*
JP2009-248770 English Machine Translation (2009).*
Adv Polym Technol 33- 21422 P Sae-Oui (2014).*
English machine translation of JP2010058290 (2010).*
Chris Schaller, 4.8 Storage and Loss Modulus, initially accessed Apr. 16, 2021, updated Jan. 18, 2022, "Polymer Chemistry", LibreTexts, https://chem.libretexts.org/Bookshelves/Organic_Chernistry/Book%3A_Polymer_Chemistry_(Schaller)/04%3A_Polymer_Properties/4.08%3A_Storage_and_Loss_Modulus.

* cited by examiner

*Primary Examiner* — Callie E Shosho

(74) *Attorney, Agent, or Firm* — Thorpe North & Western

(57) ABSTRACT

A laminate for tires is a laminate of a layer of a rubber composition and a film comprising a thermoplastic resin or a thermoplastic elastomer composition; upon dynamic distortion of the film being 0.1%, a storage elastic modulus at 70° C. being 30 MPa or greater, and a thickness of the film being 60 μm or greater; upon dynamic distortion of the rubber composition being 0.1%, a storage elastic modulus at −20° C. being less than 400 MPa and a storage elastic modulus at 70° C. being 8.5 MPa or greater, and a thickness of the rubber composition being 150 μm or greater; and a peel strength between the film and the rubber composition determined by 180° peel test being 30 N/inch or greater.

10 Claims, No Drawings

LAMINATE FOR TIRES

RELATED APPLICATIONS

This application is a continuation-in-part of U.S. patent application Ser. No. 14/412,550, filed on Jan. 2, 2015, now abandoned, which is the National Stage of International Patent Application No. PCT/JP2013/067367, filed on Jun. 25, 2013, which claims the benefit of priority from Japan Patent Application No. 2012-149918, filed on Jul. 3, 2012.

TECHNICAL FIELD

The present technology relates to a laminate for tires. More specifically, the present technology relates to a laminate for tires of a film formed from a thermoplastic resin or a thermoplastic elastomer composition and a layer of a rubber composition.

BACKGROUND

Recently, the use, as an inner liner for a pneumatic tire, of a sheet-like object formed from a thermoplastic resin composition in which a thermoplastic resin is blended with an elastomer has been proposed and studied (Japanese Unexamined Patent Application Publication No. 2009-241855A). When actually using a sheet-like object formed from the thermoplastic resin composition in which a thermoplastic resin is blended with an elastomer in a pneumatic tire inner liner, normally, a production technique where a thermoplastic resin composition sheet in which a thermoplastic resin is blended with an elastomer, and a laminated sheet of a rubber (tie rubber) sheet that is vulcanization-adhered to the thermoplastic resin composition sheet are wound around a tire molding drum, overlapped to form a splice, and then vulcanization-molded, is employed.

Japanese Unexamined Patent Application publication No. H09-239905A discloses a laminate of polyamide resin layer and a rubber layer, that can be used as an inner liner layer of a pneumatic tire. In the laminate, in order to enhance adhesion between the polyamide resin layer and the rubber layer, an N-alkoxymethylurea derivative is contained at least in the rubber layer, and a resorcin/formaldehyde condensate is contained in the rubber layer and/or the polyamide resin layer.

Japanese Unexamined Patent Application Publication No. 2003-097644A discloses a laminate in which a vibration isolating rubber layer is provided in between two polyamide resin layers, wherein the vibration isolating rubber layer is formed from a vulcanized product of a rubber composition containing (A) rubber containing diene rubber or a methylene group, (B) a vulcanizing agent, (C) a resorcinol compound, and (D) a melamine resin as essential components, and the vibration isolating rubber layer is chemically adhered to the polyamide resin layer, although use of the laminate in a pneumatic tire is not suggested.

Japanese Unexamined Patent Application Publication No. 2004-042495A discloses a laminate formed by laminating a metal foil and a resin film on the outer circumferential surface of a rubber layer formed by using (A) at least one of acrylonitrile-butadiene copolymer rubber or hydrogenated acrylonitrile-butadiene copolymer rubber, (B) a peroxide vulcanizing agent, (C) a resorcinol compound, and (D) a melamine resin, although use of the laminate in a pneumatic tire is not suggested.

In pneumatic tires having an inner liner layer formed from a laminated sheet in which a laminated sheet having a sheet formed from a thermoplastic resin or a thermoplastic resin composition in which a thermoplastic resin is blended with an elastomer is laminated with a rubber that is vulcanization-adhered to the thermoplastic resin or the thermoplastic resin composition is cut into a predetermined length, and the both ends of the laminated sheet are overlapped to form a splice by wrapping the laminated sheet around a tire molding drum, and then the resultant is vulcanization-molded, the pneumatic tire had a problem in appearance where, after traveling using the tire, cracks occur in the overlapped-splice portion of the laminated sheet.

SUMMARY

The present technology provides a laminate for tires that can suppress the occurrence of cracks after traveling using the tire.

As a result of diligent research based on the idea that the cracks are caused by concentration of stress at the overlapped-splice portion, the present inventors found that it is possible to suppress the cracks by mitigating the concentration of stress at the overlapped-splice portion by compounding a rubber composition having a high storage elastic modulus at the overlapped-splice portion, and achieved the present technology.

Therefore, the present technology has a configuration described in [1] below.

[1] A laminate for tires, the laminate being a laminate of a layer of a rubber composition and a film comprising a thermoplastic resin or a thermoplastic elastomer composition; upon dynamic distortion of the film being 0.1%, a storage elastic modulus at 70° C. being 30 MPa or greater, and a thickness of the film being 60 μm or greater; upon dynamic distortion of the rubber composition being 0.1%, a storage elastic modulus at −20° C. being less than 400 MPa and a storage elastic modulus at 70° C. being 8.5 MPa or greater, and a thickness of the rubber composition being 150 μm or greater; and a peel strength between the film and the rubber composition determined by 180° peel test being 30 N/inch or greater.

Furthermore, the present technology preferably has configurations described in [2] to [4] below.

[2] The laminate for tires according to [1] above, wherein the rubber composition contains: a condensation product of formaldehyde and a compound represented by Formula (1):

[Formula 1]

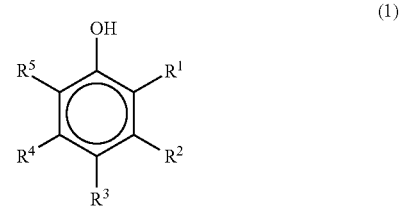

wherein, $R^1$, $R^2$, $R^3$, $R^4$, and $R^5$ represent hydrogen, a hydroxyl group, or an alkyl group having from 1 to 8 carbons; and a methylene donor; a compounded amount of the condensation product is from 0.5 to 20 parts by weight per 100 parts by weight of a rubber component; a compounded amount of the methylene donor is from 0.25 to 200 parts by weight per 100 parts by weight of the rubber component; a ratio of the compounded amount of the methylene donor to the compounded amount of the condensation product is from 0.5 to 10.

[3] The laminate for tires according to [1] or [2] above, wherein the rubber composition contains from 30 to 80 parts by weight of a filler per 100 parts by weight of the rubber component; and the filler is carbon black having a nitrogen adsorption specific surface area of 40 $m^2/g$ or greater.

[4] The laminate for tires according to any one of [1] to [3] above, wherein the rubber composition contains from 10 to 100 parts by weight of butadiene rubber per 100 parts by weight of the rubber component.

Furthermore, the present technology has a configuration described in [5] below.

[5] A laminate for tires, the laminate being a laminate of a layer of a rubber composition and a film comprising a thermoplastic resin or a thermoplastic elastomer composition; the rubber composition containing a condensation product of formaldehyde and a compound represented by Formula (1):

[Formula 2]

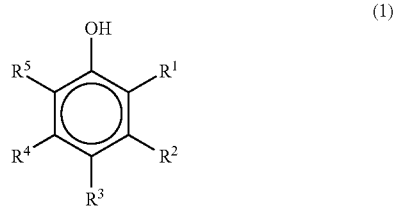

(1)

wherein, $R^1$, $R^2$, $R^3$, $R^4$, and $R^5$ represent hydrogen, a hydroxyl group, or an alkyl group having from 1 to 8 carbons;

a methylene donor; and a filler; a compounded amount of the condensation product being from 0.5 to 20 parts by weight per 100 parts by weight of the rubber component; a compounded amount of the methylene donor being from 0.25 to 200 parts by weight per 100 parts by weight of the rubber component; a ratio of the compounded amount of the methylene donor to the compounded amount of the condensation product being from 0.5 to 10; a compounded amount of the filler being from 30 to 80 parts by weight per 100 parts by weight of the rubber component; and the filler being carbon black having a nitrogen adsorption specific surface area of 40 $m^2/g$ or greater.

Furthermore, the present technology preferably has a configuration described in [6] below.

[6] The laminate for tires according to [5] above, wherein the rubber composition contains from 10 to 100 parts by weight of butadiene rubber per 100 parts by weight of the rubber component.

By using the laminate of the present technology as an inner liner of a pneumatic tire, it is possible to suppress occurrence of cracks in an overlapped-splice portion of the inner liner after traveling using the tire.

DETAILED DESCRIPTION

The film constituting the laminate for tires of the present technology comprises a thermoplastic resin or a thermoplastic elastomer composition.

Examples of the thermoplastic resin constituting the film include a polyamide resin, a polyester resin, a polynitrile resin, a polymethacrylate resin, a polyvinyl resin, a cellulose resin, a fluororesin, an imide resin, a polystyrene resin, a polyolefin resin, and the like. Examples of the polyamide resin include nylon 6 (N6), nylon 66 (N66), nylon 46 (N46), nylon 11 (N11), nylon 12 (N12), nylon 610 (N610), nylon 612 (N612), nylon 6/66 (N6/66), nylon 6/66/12 (N6/66/12), nylon 6/66/610 (N6/66/610), nylon MXD6 (MXD6), nylon 6T, nylon 6/6T, nylon 9T, a nylon 66/PP copolymer, a nylon 66/PPS copolymer, and the like. Examples of the polyester resin include aromatic polyesters, such as poly(butylene terephthalate) (PBT), poly(ethylene terephthalate) (PET), poly(ethylene isophthalate) (PEI), a PET/PEI copolymer, polyarylate (PAR), poly(butylene naphthalate) (PBN), a liquid crystal polyester, a polyoxyalkylene diimidic diacid/polybutylene terephthalate copolymer, and the like. Examples of the polynitrile resin include polyacrylonitrile (PAN), polymethacrylonitrile, an acrylonitrile/styrene copolymer (AS), a methacrylonitrile/styrene copolymer, a methacrylonitrile/styrene/butadiene copolymer, and the like. Examples of the polymethacrylate resin include poly(methyl methacrylate) (PMMA), poly(ethyl methacrylate), and the like. Examples of the polyvinyl resin include poly(vinyl acetate) (PVAc), poly(vinyl alcohol) (PVA), an ethylene-vinyl alcohol copolymer (EVOH), poly(vinylidene chloride) (PVDC), poly(vinyl chloride) (PVC), a vinyl chloride/vinylidene chloride copolymer, a vinylidene chloride/methyl acrylate copolymer, and the like. Examples of the cellulose resin include cellulose acetate, cellulose acetate butyrate, and the like. Examples of the fluororesin include poly(vinylidene fluoride) (PVDF), poly(vinyl fluoride) (PVF), polychlorofluoroethylene (PCTFE), a tetrafluoroethylene/ethylene copolymer (ETFE), and the like. Examples of the imide resin include an aromatic polyimide (PI) and the like. Examples of the polystyrene resin include polystyrene (PS) and the like. Examples of the polyolefin resin include polyethylene (PE), polypropylene (PP), and the like.

Of these, poly(vinyl alcohol), an ethylene-vinyl alcohol copolymer, nylon 6, nylon 66, nylon 11, nylon 12, nylon 610, nylon 612, nylon 6/66, nylon MXD6, and nylon 6T are preferable from the perspective of satisfying both fatigue resistance and air barrier properties.

In order to improve processability, dispersibility, heat resistance, oxidation resistance, or the like, the thermoplastic resin may contain a compounding agent that is generally blended into a resin composition, such as a filler (e.g. calcium carbonate, titanium oxide, and alumina), a reinforcing agent (e.g. carbon black and white carbon black), a processing aid, a stabilizer, and an antioxidant, to the extent that it does not disturb effects of the present technology. Although it is preferable not to add a plasticizer from the perspectives of air barrier properties and heat resistance, a plasticizer may be added to the extent that it does not disturb effects of the present technology.

A thermoplastic elastomer composition constituting the film is a composition in which an elastomer component is dispersed in a thermoplastic resin component, the thermoplastic resin component constitutes a matrix phase, and the elastomer component constitutes a dispersion phase.

As a thermoplastic resin component constituting the thermoplastic elastomer composition, the same thermoplastic resins described above can be used.

Examples of the elastomer component constituting the thermoplastic elastomer composition include diene rubber and hydrogenated products thereof, olefin rubber, halogen-containing rubber, silicone rubber, sulfur-containing rubber, fluororubber, and the like. Examples of the diene rubber and hydrogenated products thereof include natural rubber (NR), isoprene rubber (IR), epoxidized natural rubber (ENR), styrene butadiene rubber (SBR), butadiene rubber (BR) (high-cis BR and low-cis BR), acrylonitrile butadiene rubber (NBR), hydrogenated NBR, hydrogenated SBR, and the like. Examples of the olefin rubber include ethylene propylene rubber (EPM), ethylene propylene diene rubber (EPDM), maleic acid-modified ethylene propylene rubber (M-EPM), a maleic anhydride-modified ethylene-α-olefin copolymer, an ethylene-glycidyl methacrylate copolymer, a maleic anhydride-modified ethylene-ethylacrylate copolymer (modified EEA), butyl rubber (IIR), a copolymer of isobutylene and an aromatic vinyl or diene monomer, acrylic rubber (ACM), an ionomer, and the like. Examples of the halogen-containing rubber include halogenated butyl rubber, such as brominated butyl rubber (Br-IIR) or chlorinated butyl rubber (Cl-IIR), a brominated isobutylene-p-methylstyrene copolymer (BIMS), halogenated isobutylene-isoprene copolymer rubber, chloroprene rubber (CR), hydrin rubber (CHR), chlorosulfonated polyethylene (CSM), chlorinated polyethylene (CM), maleic acid-modified chlorinated polyethylene (M-CM), and the like. Examples of the silicone rubber include methyl vinyl silicone rubber, dimethyl silicone rubber, methyl phenyl vinyl silicone rubber, and the like. Examples of the sulfur-containing rubber include polysulfide rubber and the like. Examples of the fluororubber include vinylidene fluoride rubber, fluorine-containing vinyl ether rubber, tetrafluoroethylene-propylene rubber, fluorine-containing silicone rubber, fluorine-containing phosphazene rubber, and the like.

Of these, a brominated isobutylene-p-methylstyrene copolymer, a maleic anhydride-modified ethylene-α-olefin copolymer, an ethylene-glycidyl methacrylate copolymer, and a maleic anhydride-modified ethylene-ethyl acrylate copolymer are preferable from the perspective of air barrier properties.

The elastomer component may contain a compounding agent that is generally blended into a rubber composition, such as a reinforcing agent (e.g. carbon black or silica), a softening agent, an antiaging agent, or a processing aid, to the extent that it does not disturb effects of the present technology.

Although there is no particular restriction on a combination of an elastomer component and a thermoplastic resin component constituting the thermoplastic elastomer composition, examples of the combination include halogenated butyl rubber and a polyamide resin, brominated isobutylene-p-methylstyrene copolymer rubber and a polyamide resin, butadiene rubber and a polystyrene resin, isoprene rubber and a polystyrene resin, hydrogenated butadiene rubber and a polystyrene resin, ethylene propylene rubber and a polyolefin resin, ethylene propylene diene rubber and a polyolefin resin, amorphous butadiene rubber and syndiotactic poly(1,2-polybutadiene), amorphous isoprene rubber and trans-poly(1,4-isoprene), fluororubber and a fluororesin, and the like; while a combination of butyl rubber and a polyamide resin having excellent air barrier properties is preferable. Of these, a combination of brominated isobutylene-p-methylstyrene copolymer rubber (which is a type of modified butyl rubber), and nylon 6/66 or nylon 6, or a blended resin of nylon 6/66 and nylon 6 is particularly preferable from the perspective of satisfying both fatigue resistance and air barrier properties.

A thermoplastic elastomer composition can be produced by dispersing an elastomer component as a dispersion phase into a thermoplastic resin component constituting a matrix phase by melting and kneading the thermoplastic resin component and the elastomer component using, for example, a twin-screw kneader extruder. The weight ratio of a thermoplastic resin component to an elastomer component is, without being limited thereto, preferably from 10/90 to 90/10, and more preferably from 15/85 to 90/10.

The thermoplastic resin or the thermoplastic elastomer composition may contain various additives to the extent that the effects of the present technology are not disturbed.

When the dynamic distortion of the film constituting the laminate for tires of the present technology is 0.1%, the storage elastic modulus at 70° C. is 30 MPa or greater, preferably from 30 MPa to 400 MPa, and more preferably from 30 MPa to 300 MPa. In order to adjust the storage elastic modulus to less than 30 MPa, the compounded amount of rubber needs to be increased or the compounded amount of oil needs to be increased, thereby gas barrier properties of the raw materials are significantly impaired. In the present technology, the storage elastic modulus of a film is a storage elastic modulus measured by using a viscoelastic spectrometer, manufactured by Toyo Seiki Seisaku-sho, Ltd., under the following conditions: static distortion: 10%; dynamic distortion: ±0.1%; frequency: 20 Hz; and temperature was raised from −100° C. to 70° C. at a rate of temperature increase of 2° C./sec.

The thickness of the film is 60 μm or greater, preferably from 60 to 500 μm, and more preferably from 90 to 200 μm. If the thickness is too small, desired gas barrier properties cannot be achieved. On the other hand, if the thickness is too large, it will be difficult to hold the film on the tire inner surface.

The rubber composition constituting the laminate for tires of the present technology contains a rubber component. Examples of the rubber component include diene rubber and hydrogenated products thereof, olefin rubber, halogen-containing rubber, silicone rubber, sulfur-containing rubber, fluororubber, and the like. Examples of the diene rubber and hydrogenated products thereof include natural rubber (NR), isoprene rubber (IR), epoxidized natural rubber (ENR), styrene butadiene rubber (SBR), butadiene rubber (BR) (high-cis BR and low-cis BR), acrylonitrile butadiene rubber (NBR), hydrogenated NBR, hydrogenated SBR, and the like. Examples of the olefin rubber include ethylene propylene rubber (EPM), ethylene propylene diene rubber (EPDM), maleic acid-modified ethylene propylene rubber (M-EPM), a maleic anhydride-modified ethylene-α-olefin copolymer, an ethylene-glycidyl methacrylate copolymer, a maleic anhydride-modified ethylene-ethylacrylate copolymer (modified EEA), butyl rubber (IIR), a copolymer of isobutylene and an aromatic vinyl or diene monomer, acrylic rubber (ACM), an ionomer, and the like. Examples of the halogen-containing rubber include halogenated butyl rubber, such as brominated butyl rubber (Br-IIR) or chlorinated butyl rubber (Cl-IIR), a brominated isobutylene-p-methylstyrene copolymer (BIMS), halogenated isobutylene-isoprene copolymer rubber, chloroprene rubber (CR), hydrin rubber (CHR), chlorosulfonated polyethylene (CSM), chlorinated polyethylene (CM), maleic acid-modified chlorinated polyethylene (M-CM), and the like. Examples of the silicone rubber include methyl vinyl silicone rubber, dimethyl silicone rubber, methyl phenyl vinyl silicone rubber, and the like. Examples of the sulfur-containing rubber include polysulfide rubber and the like. Examples of the fluororubber include vinylidene fluoride rubber, fluorine-containing vinyl ether rubber, tetrafluoroethylene-propylene rubber, fluorine-containing silicone rubber, fluorine-containing phosphazene rubber, and the like. Of these, from the perspective of co-crosslinking with an adjacent rubber material, diene rubber, olefin rubber, and halogen-containing rubber are preferable. The rubber component may be a mixture of two or more rubber components.

The rubber component more preferably contains diene rubber. Examples of diene rubber include natural rubber (NR), epoxidized natural rubber (ENR), isoprene rubber (IR), styrene butadiene rubber (SBR), butadiene rubber (BR), acrylonitrile/butadiene rubber (NBR), and the like. Of these, from the perspective of co-crosslinking with an adjacent rubber material, natural rubber, epoxidized natural rubber, styrene butadiene rubber, butadiene rubber, isoprene rubber, and mixtures thereof are preferable.

The rubber component more preferably contains from 10 to 100 parts by weight, and even more preferably from 40 to 98 parts by weight, of butadiene rubber per 100 parts by weight of rubber component. For cases where the rubber component contains rubber component other than butadiene rubber, the rubber component other than butadiene rubber is preferably natural rubber or isoprene rubber. That is, the rubber component is particularly preferably a combination of butadiene rubber and natural rubber, or a combination of butadiene rubber and isoprene rubber.

The rubber composition preferably contains a condensation product of formaldehyde and a compound represented by Formula (1):

[Formula 3]

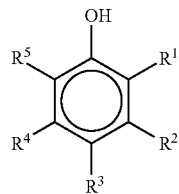

(1)

(in the formula, $R^1$, $R^2$, $R^3$, $R^4$, and $R^5$ represent hydrogen, a hydroxyl group, or an alkyl group having from 1 to 8 carbons); and a methylene donor. By compounding this condensation product and the methylene donor, it is possible to further enhance the adhesion strength of the interface between the film and a layer of the rubber composition.

In a preferable example of a compound represented by Formula (1), at least one of $R^1$, $R^2$, $R^3$, $R^4$ and $R^5$ is an alkyl group having from 1 to 8 carbons, and the others are hydrogens or alkyl groups having from 1 to 8 carbons. A specific preferable example of a compound represented by Formula (1) is cresol.

In another preferable example of a compound represented by Formula (1), at least one of $R^1$, $R^2$, $R^3$, $R^4$, and $R^5$ is a hydroxyl group, and the others are hydrogens or alkyl groups having from 1 to 8 carbons. Another specific preferable example of a compound represented by Formula (1) is resorcin.

Examples of a condensation product of a compound represented by Formula (1) and formaldehyde include a cresol/formaldehyde condensate, a resorcin/formaldehyde condensate, and the like. These condensation products may be modified to the extent that the effects of the present technology are not disturbed. For example, a modified resorcin/formaldehyde condensate modified by an epoxy compound can be utilized in the present technology. These condensation products are commercially available, and the commercial products can be used in the present technology.

A condensation product of a compound represented by Formula (1) and formaldehyde is preferably a compound represented by Formula (2) or Formula (3).

[Formula 4]

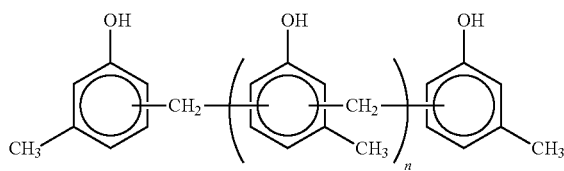

(2)

In the formula, n is an integer, and preferably an integer from 1 to 5.

[Formula 5]

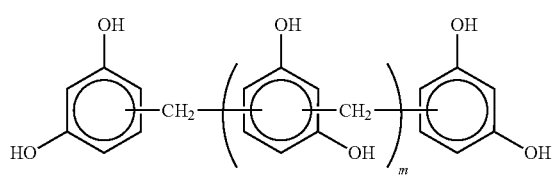

(3)

In the formula, m is an integer, and preferably an integer from 1 to 3.

A "methylene donor" refers to a basic compound, which generates formaldehyde by heating, etc. Examples thereof include hexamethylenetetramine, pentamethylenetetramine, hexamethylenediamine, methylolmelamine, etherified methylolmelamine, modified etherified methylolmelamine, esterified methylolmelamine, hexamethoxymethylolmelamine, hexamethylolmelamine, hexakis(ethoxymethyl)melamine, hexakis(methoxymethyl)melamine, N,N',N"-triethyl-N,N',N"-trimethylolmelamine, N,N',N"-trimethylolmelamine, N-methylolmelamine, N,N'-bis(methoxymethyl)melamine, N,N',N"-tributyl-N,N',N"-trimethylolmelamine, paraformaldehyde, and the like.

Of these, from the perspective of the formaldehyde release temperature, a modified etherified methylolmelamine is preferable.

The compounded amount of a condensation product of a compound represented by Formula (1) and formaldehyde (hereinafter, also referred to simply as "condensation product") is from 0.5 to 20 parts by weight, and preferably from 1 to 10 parts by weight, per 100 parts by weight of the rubber component. If the compounded amount of the condensation product is too low, the amount of heat and time required for heating in order to obtain adequate adhesion increases and the vulcanization efficiency decreases. On the other hand, if the compounded amount of the condensation product is too high, the elongation of a vulcanized product of the obtained rubber composition is impaired leading to being easily broken.

The compounded amount of the methylene donor is from 0.25 to 200 parts by weight, preferably from 0.5 to 80 parts by weight, and more preferably from 1 to 40 parts by weight, per 100 parts by weight of the rubber component. If the compounded amount of the methylene donor is too low, the donor is used up by a resin reaction in the rubber composition system and a reaction in an interface reaction does not proceed well, and the adhesion becomes poor. On the other hand, if the compounded amount of the methylene donor is too large, the reaction in the rubber composition system may be accelerated too much, or a crosslinking reaction in a resin system of an adherend may be triggered, thereby impairing the adhesion.

The ratio of the compounded amount of the methylene donor to the compounded amount of the condensation product is from 0.5 to 10, preferably from 1 to 4, and more preferably from 1 to 3. If the ratio is too small, the donor is used up by a resin reaction in the rubber composition system, and a reaction in an interface reaction does not proceed well, and the adhesion becomes poor. On the other hand, if the ratio is too large, the reaction in the rubber composition system may be accelerated too much, or a crosslinking reaction in a resin system of an adherend may be triggered, thereby impairing the adhesion.

The rubber composition constituting the laminate for tires of the present technology may contain carbon black as a filler. The carbon black is a carbon black having a nitrogen adsorption specific surface area ($N_2SA$) of 40 $m^2/g$ or greater, preferably of 40 to 150 $m^2/g$, and more preferably of 70 to 130 $m^2/g$, according to the classification of carbon blacks for rubber of ASTM D1765-96. Examples of the carbon black include FEF ($N_2SA$: 41 $m^2/g$), HAF ($N_2SA$: 79 $m^2/g$), ISAF ($N_2SA$: 115 $m^2/g$), and the like. The compounded amount of the carbon black is from 30 to 80 parts by weight, and preferably from 45 to 65 parts by weight, per 100 parts by weight of the rubber component.

The rubber composition may further contain a vulcanizing agent, a vulcanization accelerating aid, a vulcanization accelerator, an antiscorching agent, an antiaging agent, a peptizing agent, an organic modifier, a tackifier, and various additives that are typically used in tire production. The compounded amount of the additives may be a typical compounding amount that has been conventionally used as long as it does not impede the object of the present technology.

In the present technology, when the dynamic distortion of the rubber composition is 0.1%, the storage elastic modulus at $-20°$ C. is 400 MPa or less, preferably from 1 MPa to 400 MPa, and more preferably from 10 MPa to 300 MPa. If the storage elastic modulus at $-20°$ C. exceeds 400 MPa, after traveling at low temperatures using the tire, cracks occur in a sheet comprising a thermoplastic resin or a thermoplastic resin composition in which a thermoplastic resin is blended with an elastomer, disposed on the inner most layer of the tire.

In the present technology, when the dynamic distortion of the rubber composition is 0.1%, the storage elastic modulus at 70° C. is 8.5 MPa or greater, preferably from 8.5 MPa to 50 MPa, and more preferably from 10 MPa to 30 MPa. If the storage elastic modulus at 70° C. is less than 8.5 MPa, it is not possible to suppress occurrence of cracks of the rubber layer in an overlapped-splice portion of the inner liner of the tire after traveling using the tire.

In the present technology, the storage elastic modulus of a rubber composition is a storage elastic modulus measured by using a viscoelastic spectrometer, manufactured by Toyo Seiki Seisaku-sho, Ltd., under the following conditions: static distortion: 10%; dynamic distortion: ±0.1%; frequency: 20 Hz; and temperature was raised from $-100°$ C. to 70° C. at a rate of temperature increase of 2° C./sec.

The thickness of the layer of the rubber composition is 150 μm or greater, preferably from 150 to 5000 μm, and more preferably from 500 to 1000 μm. If the thickness of the rubber layer is too small, desired crack suppression effect cannot be achieved. On the other hand, if the thickness is too large, the weight of the tire will be increased.

In the present technology, the peel strength between the film and the rubber layer is 30 N/inch (1 inch=2.54 cm) or greater, preferably 60 N/inch or greater, and more preferably 100 N/inch or greater, determined by 180° peel test. If the peel strength is too small, peeling readily occurs at the interface between the rubber layer of the inner liner and the sheet of the overlapped-splice. In the present technology, the peel strength is determined by, after a sample of laminate is vulcanized, cutting the sample into the width of 25 mm, and measuring the peel strength of the strip-like sample using a peel tester (manufactured by Imada Co., Ltd.) in accordance with JIS-K6256.

The laminate for tires of the present technology, in which the laminate is a laminate of a layer of a rubber composition and a film comprising a thermoplastic resin or a thermoplastic elastomer composition; when the dynamic distortion of the film is 0.1%, a storage elastic modulus at 70° C. is 30 MPa or greater, and a thickness of the film is 60 μm or greater; when the dynamic distortion of the rubber composition is 0.1%, a storage elastic modulus at $-20°$ C. is less than 400 MPa and a storage elastic modulus at 70° C. is 8.5 MPa or greater, and a thickness of the rubber composition is 150 μm or greater; and a peel strength between the film and the rubber composition determined by 180° peel test is 30 N/inch or greater, can be produced by making the storage elastic modulus of the rubber composition closer to the storage elastic modulus of the film via, for example, compounding a filler with high reinforcing effects in the rubber composition, or selecting, as a raw rubber, a raw material that can result in a rubber composition with high hardness and a high elastic modulus, such as butadiene rubber having a high vinyl content in advance. As the filler, for example, carbon black having a nitrogen adsorption specific surface area ($N_2SA$) of 40 $m^2/g$ or greater according to the classification of carbon blacks for rubber of ASTM D1765-96 can be used.

The laminate of the present technology can be produced by laminating the rubber composition on the film of thermoplastic resin or thermoplastic elastomer composition. Specifically, the laminate can be produced by the following manner, although it is not limited to the following. First, a thermoplastic resin or a thermoplastic elastomer composition is molded into a film shape using a molding device such as an inflation molding device or a T-die extruder to produce a film of the thermoplastic resin or the thermoplastic elastomer composition. Then, the rubber composition is extruded and simultaneously laminated onto the film using a T-die extruder or the like to produce a laminate.

A pneumatic tire using the laminate of the present technology as an inner liner can be produced, for example, by the following. A sheet of the laminate of the present technology is cut into a predetermined length, and wound around a molding drum in the manner so that the sheet is overlapped to form a splice. Then, on the sheet, members made from unvulcanized rubber that are normally used in the manufacture of tires such as a carcass layer, a belt layer, and a tread layer, are adhered sequentially in layers and molded. Thereafter, the drum is removed to form a green tire, and then the green tire is heat vulcanized using a conventional method to produce a tire. For cases where the thermoplastic elastomer composition is used as the film, cutting of the laminate of the present technology into a predetermined length is preferably performed by thermal cutting at a temperature greater than or equal to the melting point of the thermoplastic resin in the laminate. Therefore, it is possible to prevent the vulcanization adhesivity between the film layer and the rubber composition layer from being decreased since the thermoplastic resin component in the thermoplastic elastomer composition is melted and flowed to coat the elastomer component present on the cut surface.

Further one embodiment of the invention provides a laminate for tires, the laminate being a laminate of a layer of a rubber composition and a polyimide film, wherein the rubber composition contains: a rubber component; a condensation product of formaldehyde and a compound represented by Formula (1):

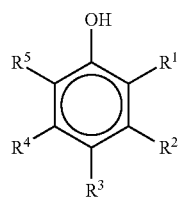

(1)

wherein, $R^1$, $R^2$, $R^3$, $R^4$, and $R^5$ represent hydrogen, a hydroxyl group, an alkyl group having from 1 to 8 carbons, or an alkoxy group having from 1 to 8 carbons; and a methylene donor. The rubber component may comprise isobutylene-p-alkylstyrene copolymer. The ratio of the methylene donor to the condensation product may be from 1.0 to 3.0. The rubber component may further comprise isobutylene-isoprene copolymer. The laminate of this embodiment of the invention exhibits improved bonding force between the polyimide film and the layer of the rubber composition.

Examples (1) Production of Film

A thermoplastic elastomer composition was prepared by compounding the raw materials at compounding proportions described in Table 1, and then the thermoplastic elastomer composition was molded using an inflation molding device to produce a film with the thickness of 100 μm. The produced film is referred to as "film A".

[Table 1]

TABLE 1

| Compounding of thermoplastic elastomer composition | | pbw |
|---|---|---|
| BIMS[a] | Exxpro 3035, manufactured by ExxonMobil Chemical Company | 100 |
| Zinc oxide | Zinc oxide type III, manufactured by Seido Chemical Industry Co., Ltd. | 0.5 |
| Stearic acid | Industrial stearic acid | 0.2 |
| Zinc stearate | Zinc stearate, manufactured by NOF Corporation | 1 |
| N6/66 | UBE nylon 5033B, manufactured by Ube Industries, Ltd. | 100 |
| Modified EEA[b] | HPR-AR 201, manufactured by Du Pont-Mitsui Polychemicals Co., Ltd. | 10 |

Note:
[a] Brominated isobutylene-p-methylstyrene copolymer
[b] Maleic anhydride-modified ethylene-ethylacrylate copolymer A film with the thickness of 60 μm was produced by molding UBE nylon 5013B (Nylon 6/66; manufactured by Ube Industries, Ltd.) using an inflation molding device. The produced film is referred to as "film B".

(2) Production of Rubber Composition

By compounding the raw materials at compounding proportions described in Tables 2 and 3 below, 9 types of rubber compositions were produced.

Styrene butadiene rubber: Nipol 1502, manufactured by Zeon Corporation

Butadiene rubber: Nipol BR1220, manufactured by Zeon Corporation

Natural rubber: SIR-20

Epoxidized natural rubber: ENR-50, manufactured by Muang Mai Guthrie Public Company Limited Carbon black (GPF): Seast V, manufactured by Tokai Carbon Co., Ltd.

Carbon black (FEF): HTC-100, manufactured by NSCC Carbon Co., Ltd.

Carbon black (HAF): Shoblack N330T, manufactured by Showa Cabot K.K.

Carbon black (ISAF): Shoblack N220, manufactured by Showa Cabot K.K.

Stearic acid: stearic acid for industrial use

Aroma oil: Desolex No. 3, manufactured by Showa Shell Sekiyu K.K.

Zinc oxide: Zinc oxide type III, manufactured by Seido Chemical Industry Co., Ltd.

Modified resorcin/formaldehyde condensate: Sumikanol 620, manufactured by Taoka Chemical Co., Ltd.

Methylene donor: modified etherified methylolmelamine (Sumikanol 507AP, manufactured by Taoka Chemical Co., Ltd.)

Sulfur: 5% oil extended sulfur

Vulcanization accelerator: Nocceler CZ-G, manufactured by Ouchi Shinko Chemical Industrial Co., Ltd.

(3) Production of Laminate

On each of the film A and the film B produced in (1), the rubber composition produced in (2) was extruded and laminated at the thickness of 700 μm. Thereby, 18 types of laminates were produced.

(4) Production of Pneumatic Tire

A tire having the size of 215/70R15 that used the sheet of the laminate produced in (3) as an inner liner was produced as follows. The laminated sheet was thermally cut (cutting temperature: 300° C.) into a predetermined length using a heat cutter (cutter with heating wire (diameter: 0.6 mm)). The cut sheet was wound around a molding drum in the manner so that the sheet was overlapped to form a splice. Then, on the sheet, members made from unvulcanized rubber that were normally used in the manufacture of tires such as a carcass layer, a belt layer, and a tread layer, were adhered sequentially in layers and molded. Thereafter, the drum was removed to form a green tire, and then the green tire was heat vulcanized using a conventional method to produce a tire.

(5) Evaluation

The storage elastic moduli of the produced films and the rubber compositions were evaluated. Furthermore, peel strength of the produced laminate was evaluated. Furthermore, peeling of the laminates that were used as inner liner materials, low temperature durability of the film, and durability of the overlapped-splice portion were evaluated using a pneumatic tire produced by using the laminate as an inner liner. Evaluation results are shown in Tables 2 and 3. The evaluation items and evaluation methods are as follows.

[Measurement of Dynamic Visco-Elasticity]

For the films and rubber compositions that were produced in (1) and (2), values at −20° C. and 70° C. were measured by using a viscoelastic spectrometer, manufactured by Toyo Seiki Seisaku-sho, Ltd., under the following conditions: static distortion: 10%; dynamic distortion: ±0.1%; frequency: 20 Hz; and temperature was raised from −100° C. to 70° C. at a rate of temperature increase of 2° C./sec. The storage elastic moduli of the rubber compositions are shown in Tables 2 and 3.

Note that the storage elastic moduli at 70° C. of the film A and the film B that were used were 58.6 MPa and 257 MPa, respectively.

[Peel Strength]

The sample of the laminate produced in (3) was, after vulcanization, cut into the width of 25 mm. The strip-like sample was subjected to a 180° peel test using a peel tester (manufactured by Imada Co., Ltd.) in accordance with JIS-K6256, and the obtained value was used as the peel strength (unit: N/inch).

[Evaluation of Adhesion]

The pneumatic tire produced in (4) was assembled on a 15×6JJ size rim, inflated to an inner pressure of 200 kPa, and mounted on an FF passenger car having an engine displacement of 1,800 cc. Then, the tire was run in an urban area for 30,000 km. Thereafter, the tire was removed from the rim and an inner surface thereof was observed to determine presence/absence of peeling failure of the laminate used as the inner liner material. "○" indicates the case where no peeling was observed, and "x" indicates the case where peeling was observed.

[Evaluation of Low Temperature Durability of Film]

The pneumatic tire produced in (4) (rim: 15×6JJ) was used to run on a drum (1707 mmφ) at −35° C. under the following test conditions: air pressure: 140 kPa; load: 5.5 kN; and the running speed of 80 km/h for 10,000 km. Thereafter, occurrence of cracks in the overlapped-splice portion in the inner liner layer on the tire inner side was visually observed. "○" indicates the case where no cracks were observed, and "x" indicates the case where a crack was observed.

[Evaluation of Durability of Overlapped-Splice Portion]

The pneumatic tire produced in (4) (rim: 15×6JJ) was used to run on a drum (1707 mmφ) at a room temperature of 38° C. under the following test conditions: air pressure: 140 kPa; load: 5.5 kN; and the running speed of 80 km/h for 10,000 km. Thereafter, occurrence of cracks in the rubber layer of the overlapped-splice portion in the inner liner layer on the tire inner side was visually observed. "○" indicates the case where no cracks were observed, and "x" indicates the case where a crack was observed.

TABLE 2

Compounding of rubber compositions and evaluation results

|  |  | Comparative Example 1 | Comparative Example 2 | Comparative Example 3 | Comparative Example 4 |
|---|---|---|---|---|---|
| Styrene butadiene rubber | pbw | 50 |  | 50 |  |
| Butadiene rubber | pbw |  |  |  | 50 |
| Natural rubber | pbw | 50 | 70 | 50 | 50 |
| Epoxidized natural rubber | pbw |  | 30 |  |  |
| Carbon black (GPF) | pbw | 50 | 50 | 50 | 50 |
| Carbon black (FEF) | pbw |  |  |  |  |
| Carbon black (HAF) | pbw |  |  |  |  |
| Carbon black (ISAF) | pbw |  |  |  |  |
| Stearic acid | pbw | 1 | 1 | 1 | 1 |
| Aroma oil | pbw | 7 | 7 | 7 | 7 |
| Zinc oxide | pbw | 3 | 3 | 3 | 3 |
| Modified resorcin/formaldehyde condensate | pbw |  |  | 2 | 2 |
| Methylene donor | pbw |  |  | 4 | 4 |
| Sulfur | pbw | 3 | 3 | 3 | 3 |
| Vulcanization accelerator | pbw | 1 | 1 | 1 | 1 |
| Storage elastic modulus of rubber composition (−20° C.) | MPa | 80.0 | 543.0 | 85.0 | 15.9 |
| Storage elastic modulus of rubber composition (70° C.) | MPa | 5.0 | 5.3 | 8.0 | 6.1 |
| Peel strength (in the case of using laminate with film A) | N/inch | 15 | 80 | 150 | 300 or greater |
| Adhesion evaluation (in the case of using laminate with film A) |  | x | ○ | ○ | ○ |
| Low temperature durability of film (in the case of using laminate with film A) |  | Not measured | x | ○ | ○ |
| Durability of overlapped-splice portion (in the case of using laminate with film A) |  | Not measured | x | x | x |
| Peel strength (in the case of using laminate with film B) | N/inch | 10 | 56 | 100 | 300 or greater |

TABLE 2-continued

Compounding of rubber compositions and evaluation results

| | Comparative Example 1 | Comparative Example 2 | Comparative Example 3 | Comparative Example 4 |
|---|---|---|---|---|
| Adhesion evaluation (in the case of using laminate with film B) | x | ○ | ○ | ○ |
| Low temperature durability of film (in the case of using laminate with film B) | Not measured | x | ○ | ○ |
| Durability of overlapped-splice portion (in the case of using laminate with film B) | Not measured | x | x | x |

TABLE 3

Compounding of rubber compositions and evaluation results

| | | Working Example 1 | Working Example 2 | Working Example 3 | Working Example 4 | Working Example 5 |
|---|---|---|---|---|---|---|
| Styrene butadiene rubber | pbw | | | | | |
| Butadiene rubber | pbw | 50 | 50 | 50 | 50 | |
| Natural rubber | pbw | 50 | 50 | 50 | 50 | 100 |
| Epoxidized natural rubber | pbw | | | | | |
| Carbon black (GPF) | pbw | | | | | |
| Carbon black (FEF) | pbw | 50 | | | 60 | |
| Carbon black (HAF) | pbw | | 50 | | | 60 |
| Carbon black (ISAF) | pbw | | | 50 | | |
| Stearic acid | pbw | 1 | 1 | 1 | 1 | 1 |
| Aroma oil | pbw | 7 | 7 | 7 | 7 | 7 |
| Zinc oxide | pbw | 3 | 3 | 3 | 3 | 3 |
| Modified resorcin/formaldehyde condensate | pbw | 2 | 2 | 2 | 2 | 2 |
| Methylene donor | pbw | 4 | 4 | 4 | 4 | 4 |
| Sulfur | pbw | 3 | 3 | 3 | 3 | 3 |
| Vulcanization accelerator | pbw | 1 | 1 | 1 | 1 | 1 |
| Storage elastic modulus of rubber composition (−20° C.) | MPa | 22.9 | 26.5 | 43.3 | 28 | 85.7 |
| Storage elastic modulus of rubber composition (70° C.) | MPa | 10.8 | 11.5 | 19.0 | 13 | 28.4 |
| Peel strength (in the case of using laminate with film A) | N/inch | 300 or greater | 300 or greater | 300 or greater | 300 or greater | 240 |
| Adhesion evaluation (in the case of using laminate with film A) | | ○ | ○ | ○ | ○ | ○ |
| Low temperature durability of film (in the case of using laminate with film A) | | ○ | ○ | ○ | ○ | ○ |
| Durability of overlapped-splice portion (in the case of using laminate with film A) | | ○ | ○ | ○ | ○ | ○ |
| Peel strength (in the case of using laminate with film B) | N/inch | 300 or greater | 300 or greater | 300 or greater | 300 or greater | 300 or greater |
| Adhesion evaluation (in the case of using laminate with film B) | | ○ | ○ | ○ | ○ | ○ |
| Low temperature durability of film (in the case of using laminate with film B) | | ○ | ○ | ○ | ○ | ○ |
| Durability of overlapped-splice portion (in the case of using laminate with film B) | | ○ | ○ | ○ | ○ | ○ |

Comparative Example 1 uses, as rubber components constituting the rubber composition, styrene butadiene rubber and natural rubber and, as a filler, carbon black (GPF). Comparative Example 1 corresponds to a conventional technology that does not use a modified resorcin/formaldehyde condensate and a methylene donor. Comparative Example 1 had low peel strength, and peeling of the laminate that was used as the inner liner material occurred.

Comparative Example 2 is the same as Comparative Example 1 except for using epoxidized natural rubber in place of styrene butadiene rubber. Since peel strength of Comparative Example 2 was enhanced, peeling of the laminate that was used as the inner liner material did not occur. However, due to excessively high storage elastic modulus at low temperatures, cracks occurred in the overlapped-splice portion of the inner liner layer in the low temperature durability test of the film. Furthermore, cracks occurred in the rubber layer of the overlapped-splice portion of the inner liner layer also in the durability test of the overlapped-splice portion.

Comparative Example 3 is the same as Comparative Example 1 except for using a modified resorcin/formaldehyde condensate and a methylene donor. Peel strength was further enhanced, and peeling of the laminate that was used as the inner liner material did not occur. Furthermore, since storage elastic modulus at low temperatures was not too high, cracks did not occur in the overlapped-splice portion of the inner liner layer in the low temperature durability test of the film. However, due to low storage elastic modulus at high temperatures, cracks occurred in the rubber layer of the overlapped-splice portion of the inner liner layer in the durability test of the overlapped-splice portion.

Comparative Example 4 is the same as Comparative Example 3 except for using butadiene rubber in place of styrene butadiene rubber. Peel strength was further enhanced, and peeling of the laminate that was used as the inner liner material did not occur. Furthermore, since storage elastic modulus at low temperatures was not too high, cracks did not occur in the overlapped-splice portion of the inner liner layer in the low temperature durability test of the film. However, due to low storage elastic modulus at high temperatures, cracks occurred in the rubber layer of the overlapped-splice portion of the inner liner layer in the durability test of the overlapped-splice portion.

Working Examples 1 to 3 are the same as Comparative Example 4 except for using, as a carbon black, FEF, HAF, and ISAF, respectively. In all the cases, peeling of the laminate that was used as the inner liner material did not occur. Furthermore, cracks did not occur in the overlapped-splice portion of the inner liner layer in the low temperature durability test of the film, and cracks also did not occur in the rubber layer of the overlapped-splice portion of the inner liner layer in the durability test of the overlapped-splice portion.

Working Example 4 is the same as Working Example 1 except for changing the compounded amount of FEF to 60 parts by weight from 50 parts by weight. Working Example 5 is a case where only natural rubber was used as the rubber component. In both cases, peeling of the laminate that was used as the inner liner material did not occur. Furthermore, cracks did not occur in the overlapped-splice portion of the inner liner layer in the low temperature durability test of the film, and cracks also did not occur in the rubber layer of the overlapped-splice portion of the inner liner layer in the durability test of the overlapped-splice portion.

The laminate of the present technology can be suitably used as an inner liner material for pneumatic tires.

The invention claimed is:

1. A laminate for tires, the laminate being a laminate of a layer of a rubber composition and a film comprising a thermoplastic resin or a thermoplastic elastomer composition;
    a thickness of the film being from 60 μm to 180 μm and the film having a storage elastic modulus at 70° C. being 30 MPa or greater upon dynamic distortion of the film being 0.1%;
    a thickness of the layer being from 150 μm to 1000 μm and the layer having a storage elastic modulus at −20° C. being less than 400 MPa and a storage elastic modulus at 70° C. being 8.5 MPa or greater upon dynamic distortion of the rubber composition being 0.1%; and
    a peel strength between the film and the layer determined by 180° peel test being 30 N/inch or greater.

2. The laminate for tires according to claim 1, wherein the rubber composition contains: a condensation product of formaldehyde and a compound represented by Formula (1):

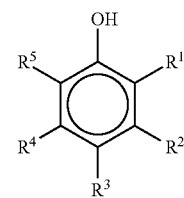

wherein, $R^1$, $R^2$, $R^3$, $R^4$, and $R^5$ represent hydrogen, a hydroxyl group, or an alkyl group having from 1 to 8 carbons; and
a methylene donor;
a compounded amount of the condensation product is from 0.5 to 20 parts by weight per 100 parts by weight of a rubber component;
a compounded amount of the methylene donor is from 0.25 to 200 parts by weight per 100 parts by weight of the rubber component;
a ratio of the compounded amount of the methylene donor to the compounded amount of the condensation product is from 0.5 to 10.

3. The laminate for tires according to claim 1, wherein the rubber composition contains from 30 to 80 parts by weight of a filler per 100 parts by weight of the rubber component; and the filler is carbon black having a nitrogen adsorption specific surface area of 40 m²/g or greater.

4. The laminate for tires according to claim 1, wherein the rubber composition contains from 10 to 100 parts by weight of butadiene rubber per 100 parts by weight of the rubber component.

5. The laminate for tires according to claim 1, wherein the film has the storage elastic modulus at 70° C. being 30 MPa or greater and 400 MPa or less upon dynamic distortion of the film of 0.1%.

6. The laminate for tires according to claim 1, wherein the rubber composition contains from 30 to 100 parts by weight of butadiene rubber per 100 parts by weight of the rubber component.

7. A laminate for tires, the laminate being a laminate of a layer of a rubber composition and a film comprising a thermoplastic resin or a thermoplastic elastomer composition; the rubber composition containing a condensation product of formaldehyde and a compound represented by Formula (1):

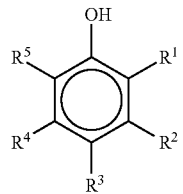

(1)

wherein, $R^1$, $R^2$, $R^3$, $R^4$, and $R^5$ represent hydrogen, a hydroxyl group, or an alkyl group having from 1 to 8 carbons;

a methylene donor; and a filler;

a compounded amount of the condensation product being from 0.5 to 20 parts by weight per 100 parts by weight of the rubber component;

a compounded amount of the methylene donor being from 0.25 to 200 parts by weight per 100 parts by weight of the rubber component;

a ratio of the compounded amount of the methylene donor to the compounded amount of the condensation product being from 0.5 to 10;

a compounded amount of the filler being from 30 to 80 parts by weight per 100 parts by weight of the rubber component; and the filler being carbon black having a nitrogen adsorption specific surface area of 40 m²/g or greater.

8. The laminate for tires according to claim 7, wherein the rubber composition contains from 10 to 100 parts by weight of butadiene rubber per 100 parts by weight of the rubber component.

9. The laminate for tires according to claim 7, wherein the film has a storage elastic modulus at 70° C. being 30 MPa or greater and 400 MPa or less upon dynamic distortion of the film of 0.1%.

10. The laminate for tires according to claim 7, wherein the rubber composition contains from 30 to 100 parts by weight of butadiene rubber per 100 parts by weight of the rubber component.

* * * * *